(12) United States Patent
Gatson et al.

(10) Patent No.: US 10,475,415 B1
(45) Date of Patent: Nov. 12, 2019

(54) STROBE TRACKING OF HEAD-MOUNTED DISPLAYS (HMDS) IN VIRTUAL, AUGMENTED, AND MIXED REALITY (XR) APPLICATIONS

(71) Applicant: Dell Products, L.P., Round Rock, TX (US)

(72) Inventors: Michael S. Gatson, Austin, TX (US); Joseph Paul Marquardt, Menlo Park, CA (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/105,167

(22) Filed: Aug. 20, 2018

(51) Int. Cl.
*G09G 5/00* (2006.01)
*G06F 3/01* (2006.01)
*G06T 7/246* (2017.01)

(52) U.S. Cl.
CPC ............ *G09G 5/003* (2013.01); *G06F 3/012* (2013.01); *G06T 7/246* (2017.01); *G06T 2200/28* (2013.01)

(58) Field of Classification Search
None
See application file for complete search history.

(56) References Cited

U.S. PATENT DOCUMENTS

| 2012/0105473 A1* | 5/2012 | Bar-Zeev | G02B 27/017 345/633 |
| 2015/0023551 A1* | 1/2015 | Ramzi | G06K 9/00342 382/103 |
| 2016/0188946 A1* | 6/2016 | Todeschini | G06K 7/1443 235/462.08 |
| 2018/0357826 A1* | 12/2018 | Ross | G06T 19/006 |
| 2019/0012835 A1* | 1/2019 | Bleyer | G06T 19/006 |
| 2019/0043259 A1* | 2/2019 | Wang | G06F 3/04815 |
| 2019/0110039 A1* | 4/2019 | Linde | H04N 13/25 |
| 2019/0128718 A1* | 5/2019 | McConkey | G01F 1/74 |

* cited by examiner

*Primary Examiner* — Ke Xiao
*Assistant Examiner* — Jed-Justin Imperial
(74) *Attorney, Agent, or Firm* — Fogarty LLP (57) ABSTRACT

Systems and methods for strobe tracking of Head-Mounted Displays (HMDs) in virtual, augmented, and mixed reality (xR) applications are described. In some embodiments, an Information Handling System (IHS) may include a host processor; and a memory coupled to the host processor, the memory having program instructions stored thereon that, upon execution, cause the IHS to: receive an image of a strobe source captured by a camera; determine an instantaneous velocity of an HMD based upon the image; and render an xR frame for display by the HMD based, at least in part, upon the determination.

11 Claims, 4 Drawing Sheets

STROBE TRACKING OF HEAD-MOUNTED DISPLAYS (HMDS) IN VIRTUAL, AUGMENTED, AND MIXED REALITY (XR) APPLICATIONS

FIELD

The present disclosure generally relates to Information Handling Systems (IHSs), and, more particularly, to systems and methods for strobe tracking of Head-Mounted Displays (HMDs) in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of a head-mounted display (HMD), heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for strobe tracking of Head-Mounted Displays (HMDs) in virtual, augmented, and mixed reality (xR) applications are described. In an illustrative, non-limiting embodiment, an Information Handling System (IHS) ma include a host processor; and a memory coupled to the host processor, the memory having program instructions stored thereon that, upon execution, cause the IHS to: receive an image of a strobe source captured by a camera; determine an instantaneous velocity of a Head-Mounted Display (HMD) based upon the image; and render a virtual, augmented, or mixed reality (xR) frame for display by the HMD based, at least in part, upon the determination.

In some implementations, the strobe source may be mounted on the HMD, and the camera may be decoupled from the HMD. For example, the camera may be mounted on another HMD. In other implementations, the strobe source may be decoupled from the HMD, and the camera may be mounted on the HMD.

The camera may be configured to capture the image in synchronization with the strobe source. The strobe source may be configured to stay on for A milliseconds and off for B milliseconds, periodically, and the camera may have a frame capture period of C=A+B milliseconds. To determine the instantaneous velocity, the IHS may identify a blur length of the image using a single captured frame, and to divide the blur length by C.

The IHS may also receive a subsequent image of the strobe source, determine a subsequent instantaneous velocity of the HMD based upon the subsequent image, calculate an acceleration of the HMD based upon a difference between the subsequent instantaneous velocity and the instantaneous velocity, and render the xR frame for display by the HMD based, at least in part, upon the calculation. In some cases, the IHS may select the strobe source, among a plurality of other strobe sources, based upon a direction of a gaze or head direction by the HMD.

In another illustrative, non-limiting embodiment, a method may include receiving an image of a strobe source captured by a camera; determining an instantaneous velocity of an HMD coupled to the strobe source based upon the image; and displaying an xR frame by the HMD based, at least in part, upon the determination. The camera may be configured to capture the image in synchronization with the strobe source. The strobe source may be configured to stay on for A milliseconds and off for B milliseconds, periodically, and the camera may have a frame capture period of C=A+B milliseconds.

In various implementations, determining the instantaneous velocity further may include identifying a blur length of the image using a single captured frame. The method may also include: receiving a subsequent image of the strobe source; determining a subsequent instantaneous velocity of the HMD based upon the subsequent image; calculating an acceleration of the HMD based upon a difference between the subsequent instantaneous velocity and the instantaneous velocity; and rendering the xR frame for display by the HMD based, at least in part, upon the calculation. The method may also include selecting the strobe source, among a plurality of other strobe sources coupled to the HMD, based upon a direction of a gaze or head direction obtained by the HMD.

In yet another illustrative, non-limiting embodiment, a hardware memory device may have program instructions stored thereon that, upon execution by a processor of an IHS, cause the IHS to: receive an image of a strobe source captured by a camera; determine an instantaneous velocity of the HMD based upon the image; and render an xR frame for display by the HMD based, at least in part, upon the determination. The camera may be configured to capture the image in synchronization with the strobe source. The strobe source may be configured to stay on for A milliseconds and off for B milliseconds, periodically, and wherein the camera has a frame capture period of C=A+B milliseconds.

To determine the instantaneous velocity, the program instructions, upon execution, may cause the IHS to identify a blur length of the image using a single captured frame. The program instructions may also cause the IHS to: receive a subsequent image of the strobe source; determine a subsequent instantaneous velocity of the HMD based upon the subsequent image; calculate an acceleration of the HMD based upon a difference between the subsequent instantaneous velocity and the instantaneous velocity; and render the xR frame for display by the HMD based, at least in part, upon the calculation.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein relate to systems and methods for strobe tracking of Head-Mounted Displays (HMDs) during execution of a virtual, augmented, and mixed reality (xR) application. These techniques are particularly useful in xR applications that employ HMDs, Heads-Up Displays (HUDs), and eyeglasses—collectively referred to as "HMDs."

Figure 1:
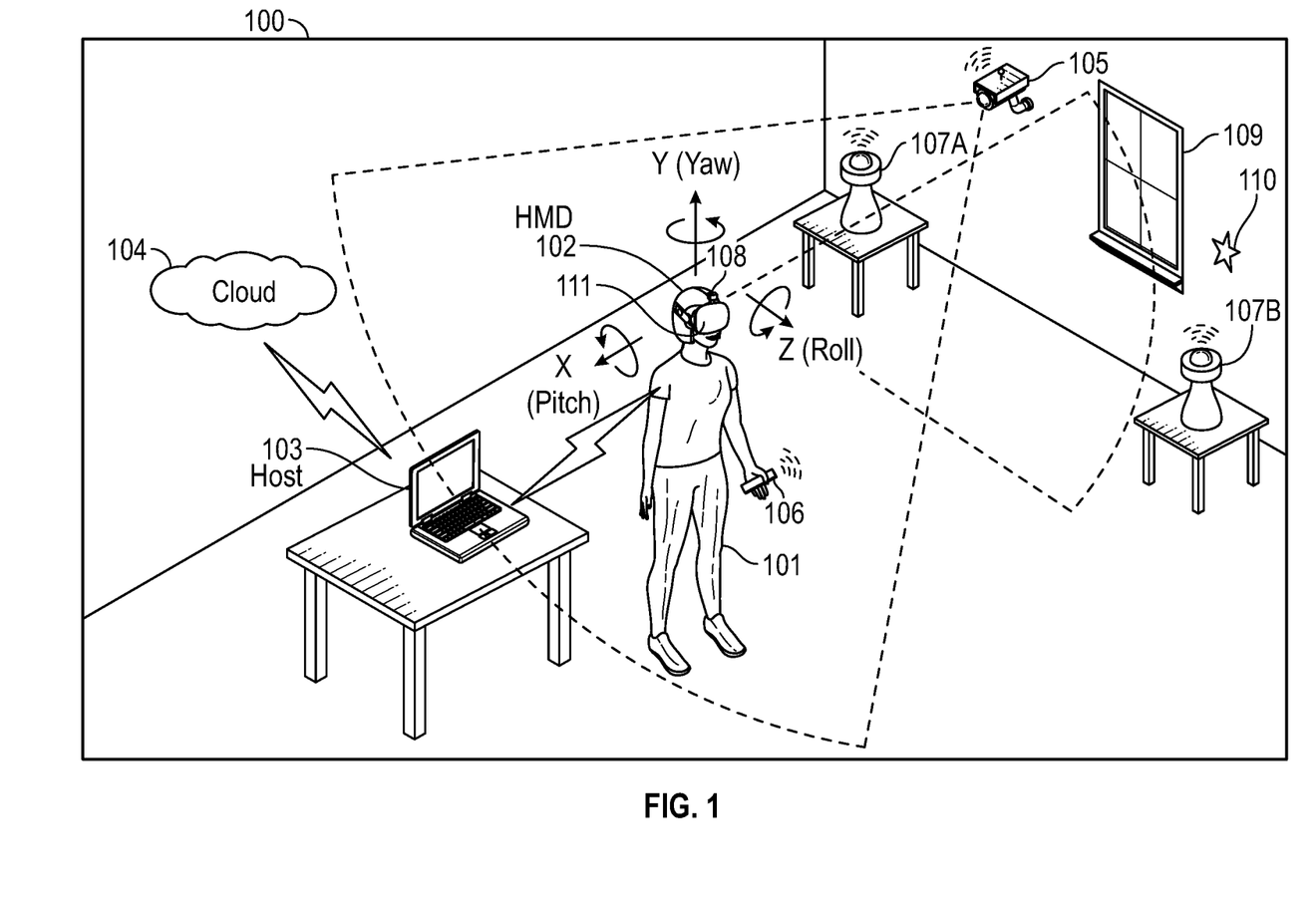
FIG. 1 is a perspective view of an example of a physical environment where a virtual, augmented, and mixed reality (xR) application is executed, according to some embodiments.

FIG. 1 is a perspective view of environment 100 where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In environment 100, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective. In other embodiments, however, HMD 102 may be an All-In-One (MO) device where all processing is done by HMD 102 itself (and host IHS 103 may be absent).

As user 101 moves about environment 100, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHS 103 may provide a cooperative, at least partially shared, xR environment between a plurality of users. For example, each user may wear their own HMD tethered to a different host IHS, such as in the form of a video game or a productivity application (e.g., a virtual meeting).

As used herein, the term SLAM refers systems and methods that use positional tracking devices to construct a map of an unknown environment where an HMD is located, and that simultaneously identifies where the HMD is located, its orientation, and/or pose.

Generally, SLAM methods implemented in connection with xR applications may include a propagation component, a feature extraction component, a mapping component, and an update component. The propagation component may receive angular velocity and accelerometer data from an Inertial Measurement Unit (IMU) built into the HMD, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as the HMD moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100 and/or one or more wearables 106 or tags 110 that are tracked; such that HMD 102 triangulates its position and/or state using those elements. Inertial tracking may use data from an accelerometer and/or gyroscope within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera. With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100.

In various embodiments, data obtained from positional tracking system(s) and technique(s) employed by HMD 102 may be received by host IHS 103, which in turn executes a SLAM module of an xR application. In the case of inside-out SLAM, for example, an xR application receives the position and orientation information from HMD 102, determines the position of selected features in the images captured by camera 108, and corrects the localization of landmarks in space using comparisons and predictions.

An estimator, such as an Extended Kalman filter (EKF) or the like, may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100 may be obtained, at least in part, from cloud 104.

In some embodiments, independently or in addition to any other SLAM system or component, HMD 102 may include strobe source 111 mounted thereon, which may in turn have one or more IR, RF, thermal, or visual active markers (e.g., an array or constellation of Light-Emitting Diodes or "LEDs"), seen by camera 105 and usable by host IHS 103 (or HMD 102) to determine a position and/or velocity and/or acceleration of HMD 102 as the user moves in space. Additionally, or alternatively, strobe source 111 may be placed on an accessory (e.g., wearable device 106).

In other embodiments, environment 100 may include strobe source(s) 111 in stationary locations (e.g., implemented in lighthouses 107A/B), which may then be visible to camera 108, and still usable by host IHS 103 (or HMD 102) to determine the position and/or velocity and/or acceleration of HMD 102, for example, using a coordinate system transformation operation and/or matrix.

In yet other embodiments, environment 100 may include strobe source(s) 111 in HMD 102 worn by user 101, which may then be visible to another camera (such as camera 108) mounted on another HMD worn by another user, for instance, during execution of a collaborative xR application between the two users. In this case, host IHS 103 may determine the position and/or velocity and/or acceleration of the other HMD, for example, using another coordinate system transformation operation and/or matrix.

In some cases, one of a plurality of stationary strobe sources (e.g., in lighthouses 107A-B) dispersed around environment 100 may be selected based upon a direction of a gaze vector obtained by gaze tracking system 212 (FIG. 2) of HMD 102 and/or upon a head direction obtained by an IMU 213 (FIG. 2) built into HMD 102; which can also identify the direction or orientation of camera 108. For example, if gaze tracking system 212 produces a gaze vector focused to the right side of window 109, lighthouse 107B may be selected as the strobe source; conversely, if gaze tracking system 212 produces a gaze vector focused to the left side of window 109, lighthouse 107A may be selected as the strobe source. Moreover, in cases where two HMDs are co-located such that a first HMD has a strobe source(s) and a second HMD has a camera, a particular strobe source of the constellation mounted on the first HMD may be selected for tracking by the second HMD based upon a comparison between the gaze or head orientation of both users that yields with clearest light-of-sight and/or highest signal-to-noise ratio (SNR).

Figure 2:
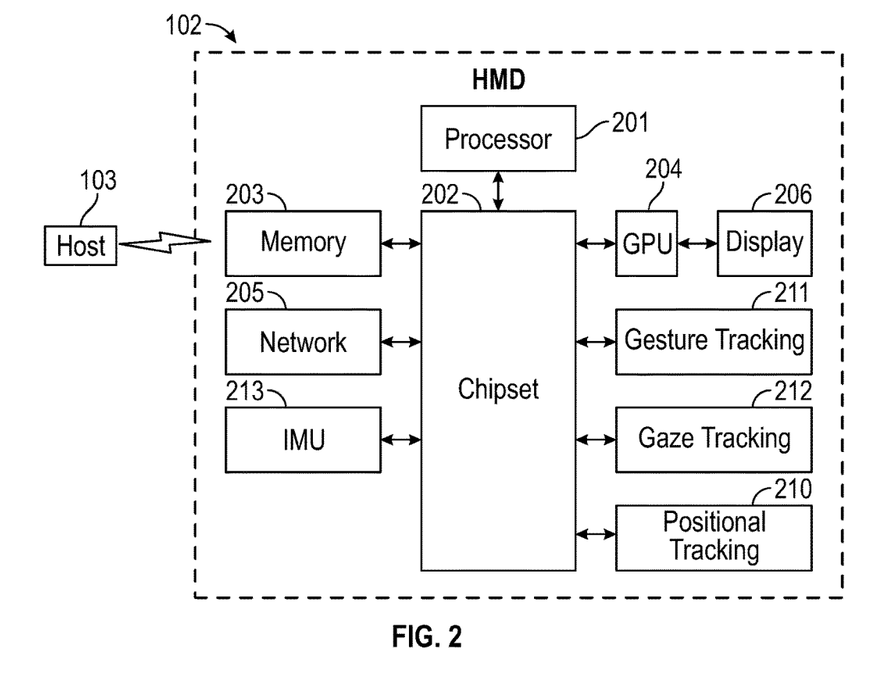
FIG. 2 is a block diagram of an example of a head-mounted display (HMD) and a host Information Handling System (IHS), according to some embodiments.

FIG. 2 is a block diagram of an example HMD 102 and host IHS 103, according to some embodiments. As depicted, HMD 102 includes components configured to display an all-immersive virtual environment and/or to overlay digitally-created content or images on a display, panel, or surface (e.g., an LCD panel, an OLED film, a projection surface, etc.), in place of and/or in addition to the user's natural visual perception of the real-world.

As shown, HMD 102 includes processor 201. In various embodiments, HMD 102 may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

HMD 102 includes chipset 202 coupled to processor 201. In certain embodiments, chipset 202 may utilize a QuickPath Interconnect (QPI) bus to communicate with processor 201. In various embodiments, chipset 202 provides processor 201 with access to a number of resources. For example, chipset 202 may be coupled to network interface 205 to enable communications via various wired and/or wireless networks.

Chipset 202 may also be coupled to display controller or graphics processor (GPU) 204 via a graphics bus, such as an Accelerated Graphics Port (AGP) or Peripheral Component Interconnect Express (PCIe) bus. As shown, graphics processor 204 provides video or display signals to display 206.

Chipset 202 further provides processor 201 and/or GPU 204 with access to memory 203. In various embodiments, memory 203 may be implemented using any suitable memory technology, such as static RAM (SRAM), dynamic RAM (DRAM) or magnetic disks, or any nonvolatile/Flash-type memory, such as a solid-state drive (SSD) or the like. Memory 203 may store program instructions that, upon execution by processor 201 and/or GPU 204, present an xR application to user 101 wearing HMD 102.

Other resources coupled to processor 201 through chipset 202 may include, but are not limited to: positional tracking system 210, gesture tracking system 211, gaze tracking system 212, and inertial measurement unit (IMU) system 213.

In some embodiments, positional tracking system 210 may include one or more optical sensors (e.g., a camera 108) configured to determine how HMD 102 moves in relation to environment 100. For example, an inside-out tracking system 210 may be configured to implement tracking techniques that use distinctive visual characteristics of the physical environment to identify specific images or shapes which are then usable to calculate HMD 102's position and orientation.

Additionally, or alternatively, positioning tracking system 210 may be configured to control strobe sources 111 and/or 107A-B in order to synchronize the strobe period of those sources with the capture period of cameras 105 and/or 108, respectively. For example, in some cases, positioning tracking system 210 may control strobe source 111 to stay on (i.e., emitting light) for A milliseconds (e.g., 2 ms), and off for B milliseconds (e.g., 1 ms), periodically. Positioning tracking system 210 may also control camera 105 to use a frame capture period of C=A+B milliseconds (e.g., 3 ms).

In some cases, periods A, B, and C may be configured and then locked to a respective local reference clock. Additionally, or alternatively, periods A, B, and C may be synchronized with a common reference clock. Additionally, or alternatively, the beginning of the A and C periods may be synchronized, optionally at every period, using a flash synchronization technique or the like.

Gesture tracking system 211 may include one or more cameras or optical sensors that enable user 101 to use their actual hands for interaction with objects rendered by HMD 102. For example, gesture tracking system 211 may be configured to implement hand tracking and gesture recognition in a 3D-space via a user-facing 2D camera. In some cases, gesture tracking system 211 may track a selectable number of degrees-of-freedom (DOF) of motion, with depth information, to recognize dynamic hand gestures (e.g., swipes, clicking, tapping, grab and release, etc.) usable to control or otherwise interact with xR applications executed by HMD 102.

Gaze tracking system 212 may include an inward-facing projector configured to create a pattern of infrared or (near-infrared) light on the user's eyes, and an inward-facing camera configured to take high-frame-rate images of the eyes and their reflection patterns; which are then used to calculate the user's eye's position and gaze point. In some cases, gaze detection or tracking system 212 may be configured to identify a direction, extent, and/or speed of movement of the user's eyes in real-time, during execution of an xR application (e.g., a gaze vector). In addition, gaze detection or tracking system 212 may be configured to calculate a ROGI, of configurable size or shape (e.g., rectangular), based in part upon a gaze vector obtained using eye/gaze tracking (EGT) processing.

IMU system 213 may include one or more accelerometers and gyroscopes configured to measure and report a specific force and/or angular rate of the user's head. In some cases, IMU system 213 may be configured to a detect a direction, extent, and/or speed of rotation (e.g., an angular speed) of the user's head in real-time, during execution of an xR application.

In some implementations, HMD 102 may communicate with host IHS 103 via wired or wireless connections (e.g., WiGig, WiFi, etc.). For example, if host IHS 103 has more processing power and/or better battery life than HMD 102, host IHS 103 may be used to offload some of the processing involved in the creation of the xR experience. In some cases, host IHS 103 may be built into (or otherwise coupled to) a backpack or vest, wearable by user 101.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

In various embodiments, HMD 102 and/or host IHS 103 may not include each of the components shown in FIG. 2. Additionally, or alternatively, HMD 102 and/or host IHS 103 may include components in addition to those shown in FIG. 2. Furthermore, components represented as discrete entities in FIG. 2 may, in some embodiments, be integrated with other components. In various implementations, all or a portion of the functionality provided by the illustrated components may be provided by components integrated as a System-On-Chip (SOC), or the like (e.g., an "MO device").

Figure 3:
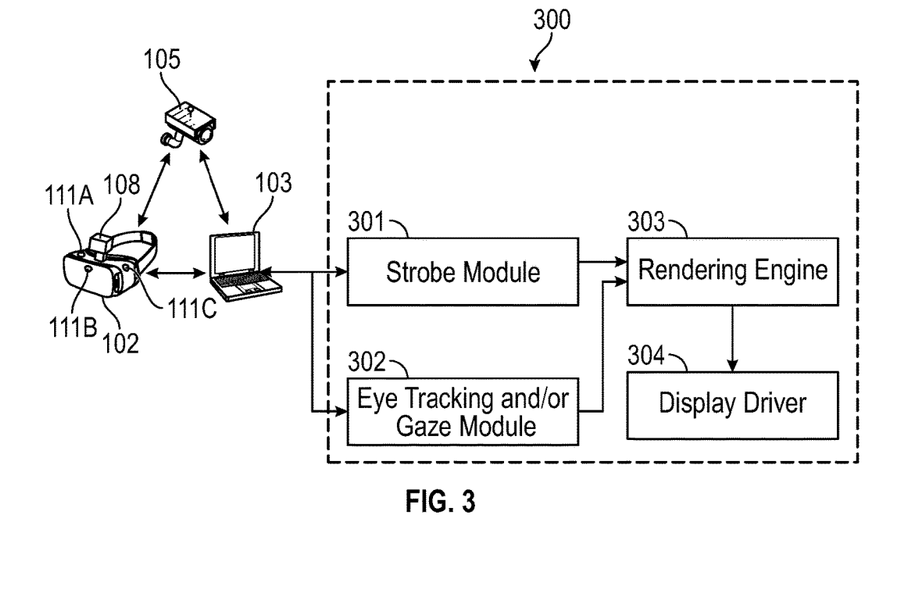
FIG. 3 is a block diagram of an example of an xR application with strobe tracking of an HMD, according to some embodiments.

FIG. 3 is a block diagram of xR application 300 with strobe tracking of HMD 102. In various embodiments, host IHS 103 may include electronic circuitry and/or program instructions stored in a hardware memory device that, upon execution by a processor, cause host IHS 103 to provide xR application 300. In this example, HMD 102 includes a plurality of outward-facing LEDs 111A-C, in an array or constellation shape (e.g., around the user's head), configured as strobe sources controlled by positional tracking system 210 and observable by camera 105 (or by camera 108 of another, co-located HMD).

As illustrated, xR application 300 includes strobe module 301, eye tracking and/or gaze module 302, rendering engine 303, and display driver 304. Strobe module 301 may be configured to receive video frames from camera 105 synchronized with strobe source(s) 111A-C, and/or from camera 108 synchronized with strobe sources 107A-B. In some cases, strobe module 301 may be configured to calculate a blur length of an image of strobe source(s) 111A-C, shown in each frame where HMD 102 has moved within environment 100, using a blur estimation method.

Then, strobe module 301 may be configured to divide the blur length in each frame by time period C, as an indication of the instantaneous velocity of HMD 102, at the time of each frame capture. Strobe module 301 may be further configured to take the difference between instantaneous velocities between subsequent frames as an indication of the HMD 102's acceleration.

Eye tracking and/or gaze module 302 may use NIR light sources to produce glints on the surface of the cornea of the user's eye, and then it may capture images of the eye region using an inward-facing camera. Eye tracking and/or gaze module 302 may estimate the user's gaze from the relative movement between the pupil center and glint positions. Particularly, an EGT algorithm may perform corneal reflection-based calculations that use NIR illumination to estimate the gaze direction or the point of gaze using polynomial functions, or a geometrical model of the human eye.

To perform gaze estimation, eye tracking and/or gaze module 302 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, eye tracking and/or gaze module 302 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, eye tracking and/or gaze module 302 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)—based EGT methods may use a geometrical model of the human eye to estimate the center of the cornea, optical and visual axes of the eye, and to estimate the gaze coordinates as points of intersection where the visual axes meets the scene.

As such, eye tracking and/or gaze module 302 may produce collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, eye tracking and/or gaze module 302 may be configured to follow the user's gaze direction for natural exploration of a visual scene by capturing the user's visual perspective. Moreover, eye tracking and/or gaze module 302 may also be configured to estimate user gaze and blink-state for interacting with the xR environment; several types of eye movements and gestures, such as saccades, smooth pursuit and nod-roll may be used. For example, eye tracking and/or gaze module 302 may be configured to use gaze, dwell time, and half-blink information for the purpose of hands-free object selection. Multiple input parameters may be used to avoid accidental selection of items. Pupil motion may be tracked to estimate a user's viewing point, with Kalman filtering to minimize pupil jitter and drifts.

Rendering engine 303 may include any engine (e.g., UNITY, UNREAL, AUTODESK, etc.) configured to render an xR model displayed by HMD 102 from user 101's unique point-of-view based upon the user's coordinate location, velocity, and/or acceleration (e.g., based on SLAM data and/or information from strobe module 301), the user's pose (e.g., from IMU 213), and/or the user's gaze (e.g., from gaze tracking system 212). Display driver 304 converts rendered video frames to a display format that HMD 102 can reproduce before the user's eyes.

Figure 4:
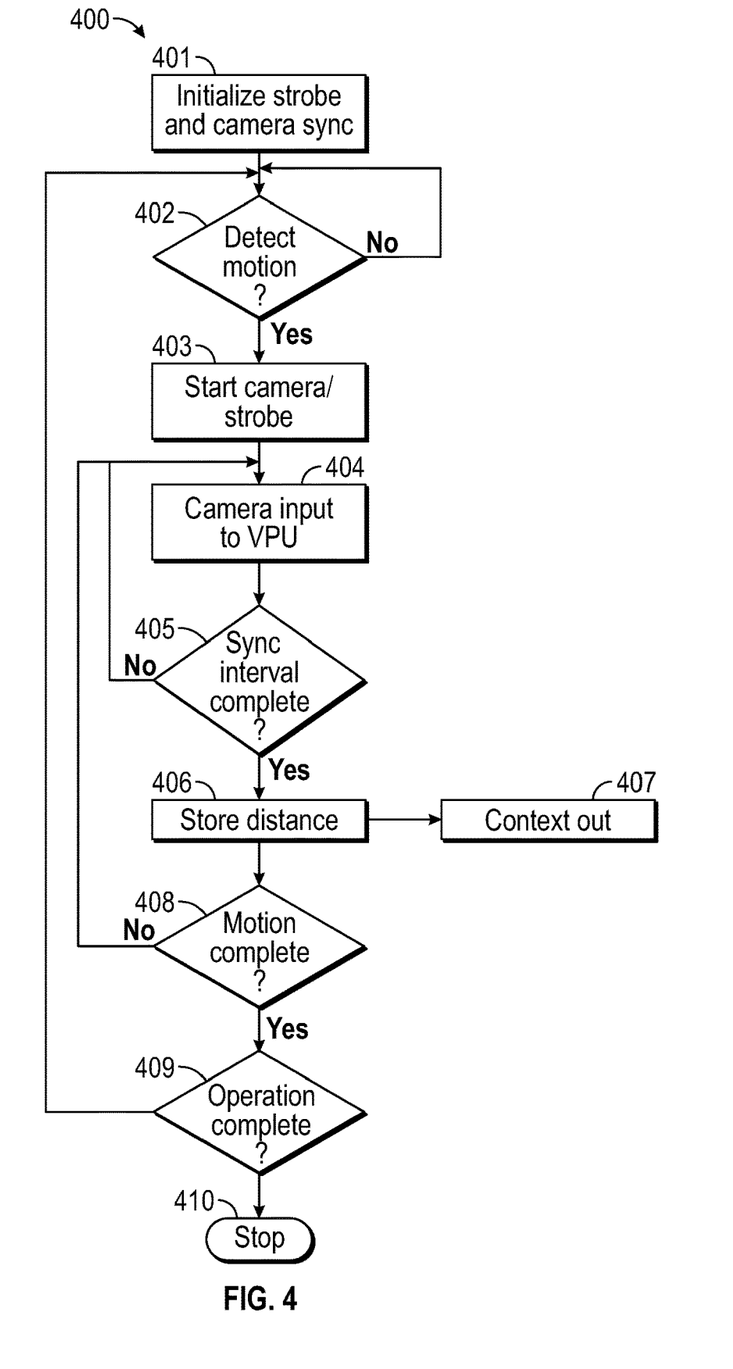
FIG. 4 is a flowchart of an example of a method for strobe tracking of an HMD, according to some embodiments.

FIG. 4 is a flowchart of method 400 for strobe tracking of HMD 102. In some embodiments, method 400 may be performed by one or more of components 301-304 during execution of xR application 300 of FIG. 3. At block 401, strobe module 301 (in host IHS 103) or positional tracking system 210 (in HMD 102) initializes strobe source(s) 111A-C/107A-B and camera(s) 105/108.

Method 400 waits at block 402 until motion is detected, for example, using a motion sensor within HMD 102 (e.g., an accelerometer, ambient light sensor, etc.). Then, at block 403, method 400 starts synchronous operation of strobe source(s) 111A-C and camera 105, and/or of strobe source(s) 107A-B and camera 108. At block 403, method 400 provides captured camera frames to a video processing unit (VPU), which performs blur length calculations and/or coordinate system inversion/transform operations.

Method 400 again waits at block 405 until the synchronization interval (e.g., period C) is completed. Then, block 406 stores the blur length, direction, and/or instantaneous velocity of strobe source 111 for the current image, and block 407 provides this information to rendering engine 301, which is usable in the rendering of subsequent frames of an xR model to be displayed by HDM 102 from the perspective of user 101.

At block 408, if motion is not complete, control returns to block 404. At block 409, if the operation is not complete, control returns to block 402. Otherwise, if both the current motion and operation are complete, method 400 ends at block 410.

As such, by executing method 400, system 300 can use light strobe(s) synchronized to camera capture frames, which permits refresh rates of the sensor to capture the distance the light source(s) have travelled during the known time frame of the pulse. In some cases, a constellation of emitted light points can provide sub-frame latency, thereby reducing the capture time. Also, because system 300 selects the change in time set to the strobes, there is no need for integral calculations. The reduced latency allows for sub-frame calculations using the known size and placement of the constellation. Either host IHS 103 and/or HMD 102 itself can track HMD 102 in 3D space using the known spatial relations, size, and timing of the strobed lights.

Figure 5:
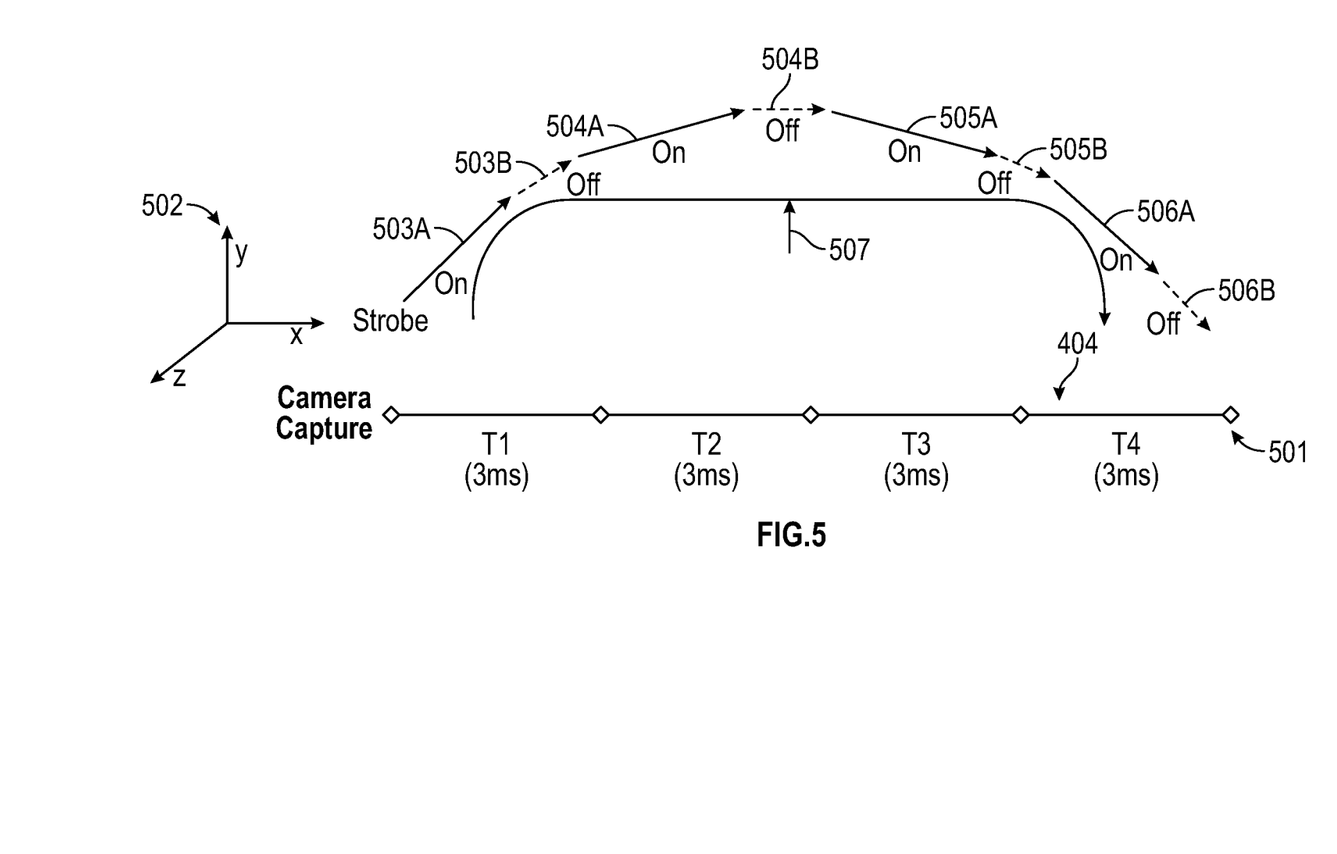
FIG. 5 is a diagram of an example of a use-case, according to some embodiments.

In use-case 500 of FIG. 5, for example, a visible Light-Emitting Diode (LED) element (e.g., any element within a constellation or array of pulsing electromagnetic sources, such as 111A-C in FIG. 1) is mounted on HMD 102, and the LED may be flickered "on" for 2 ms and "off" for 1 ms, periodically. Particularly, first strobe period T1 has "on" period 503A followed by "off" period 503B; second strobe period T2 has "on" period 504A followed by "off" period 504B; third strobe period T3 has "on" period 505A followed by "off" period 505B; and fourth strobe period T4 has "on" period 506A followed by "off" period 506B.

Vectors 503A-506A indicate the direction and length of travel of strobe source 111 and/or of the length of a blurred image of strobe source 111 in a captured frame obtained from camera 105, proportional to each vector. Accordingly, the instantaneous velocity of HMD 102 may be independently derived in each single captured frame, either relative to coordinates 502 or relative to another coordinate system.

Cameras 105 or 108 observing LED elements 111A-C or 117A-B, respectively, have a frame capture of 3 ms and are synchronized to the strobe (or vice-versa). The frames captured every 3 ms from camera 105/108 are sent to processor 201 and/or GPU 204 (also referred to as a Video Processing Unit or "VPU"), which can estimate or determine the blur length of each of the recognized LED elements in the constellation, using any suitable feature extraction technique, to get the position and the instantaneous velocity vectors (magnitude and direction) of HMD 102.

As such, application of method 400 to use-case 500 relieves a VPU from needing to do a comparative analysis of two sequential frames, and provides instantaneous velocity using only one frame at a time. Furthermore, acceleration 507 may be obtained using the previous frame's velocity and the new frame's velocity, using a linear calculation (in contrast with the integral math required when time frames are unknown).

For example, in use-case 500, the output of the VPU may be provided in the form of Table I below:

TABLE I

| T | Velocity (speed) Length/time of strobe | Acceleration [e.g., (V2 − V1)/(T2 − T1)] |
|---|---|---|
| T1 | 30 m/sec | — |
| T2 | 32 m/sec | +2 m/sec$^2$ |
| T3 | 30 m/sec | −2 m/sec$^2$ |
| T4 | 28 m/sec | −2 m/sec$^2$ |

As such, systems and methods described herein can reduce the calculation time of HMD velocity and acceleration, reducing position tracking latency, improving predictive tracking, and/or detecting multiple objects while accurately tracking their position and predicting their movement.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   receiving an image of a strobe source captured by a camera;
   determining an instantaneous velocity of a Head-Mounted Device (HMD) coupled to the strobe source by identifying a blur length of the image using a single captured frame; and
   displaying a virtual, augmented, or mixed reality (xR) frame by the HMD based, at least in part, upon the determination.

2. The IHS of claim 1, wherein the strobe source is mounted on the HMD, and wherein the camera is decoupled from the HMD.

3. The IHS of claim 2, wherein the camera is mounted on another HMD.

4. The IHS of claim 1, wherein the strobe source is decoupled from the HMD, and wherein the camera is mounted on the HMD.

5. The IHS of claim 1, wherein the program instructions, upon execution, further cause the IHS to:
   receive a subsequent image of the strobe source;
   determine a subsequent instantaneous velocity of the HMD based upon the subsequent image;
   calculate an acceleration of the HMD based upon a difference between the subsequent instantaneous velocity and the instantaneous velocity; and
   render the xR frame for display by the HMD based, at least in part, upon the calculation.

6. The IHS of claim 1, wherein the program instructions, upon execution, further cause the IHS to select the strobe source, among a plurality of other strobe sources, based upon a direction of a gaze or head direction by the HMD.

7. A method, comprising:
   receiving an image of a strobe source captured by a camera, wherein the camera is configured to capture the image in synchronization with the strobe source, wherein the strobe source is configured to stay on for A milliseconds and off for B milliseconds, periodically, and wherein the camera has a frame capture period of C=A+B milliseconds;
   determining an instantaneous velocity of a Head-Mounted Device (HMD) coupled to the strobe source by identifying a blur length of the image using a single captured frame, and dividing the blur length by C; and
   displaying a virtual, augmented, or mixed reality (xR) frame by the HMD based, at least in part, upon the determination.

8. The method of claim 7, further comprising:
   receiving a subsequent image of the strobe source;
   determining a subsequent instantaneous velocity of the HMD based upon the subsequent image;
   calculating an acceleration of the HMD based upon a difference between the subsequent instantaneous velocity and the instantaneous velocity; and
   rendering the xR frame for display by the HMD based, at least in part, upon the calculation.

9. The method of claim 7, further comprising selecting the strobe source, among a plurality of other strobe sources coupled to the HMD, based upon a direction of a gaze or head direction obtained by the HMD.

10. A hardware memory device having program instructions stored thereon that, upon execution by a processor of an Information Handling System (IHS), cause the IHS to:
    receive an image of a strobe source captured by a camera, wherein the camera is configured to capture the image in synchronization with the strobe source, wherein the strobe source is configured to stay on for A milliseconds and off for B milliseconds, periodically, and wherein the camera has a frame capture period of C=A+B milliseconds;

determine an instantaneous velocity of the HMD based upon the image, by identifying a blur length of the image using a single captured frame, and dividing the blur length by C; and render a virtual, augmented, or mixed reality (xR) frame for display by the HMD based, at least in part, upon the determination.

11. The hardware memory device of claim 10, wherein the program instructions, upon execution, further cause the IHS to:

receive a subsequent image of the strobe source;

determine a subsequent instantaneous velocity of the HMD based upon the subsequent image;

calculate an acceleration of the HMD based upon a difference between the subsequent instantaneous velocity and the instantaneous velocity; and render the xR frame for display by the HMD based, at least in part, upon the calculation.

\* \* \* \* \*